(12) United States Patent
Webster et al.

(10) Patent No.: US 11,809,527 B2
(45) Date of Patent: Nov. 7, 2023

(54) SYSTEMS AND METHODS FOR VIDEO CONTENT RESTRICTION CATEGORIZATION AND EVALUATION

(71) Applicant: Verizon Patent and Licensing Inc., Basking Ridge, NJ (US)

(72) Inventors: Christopher Webster, Redwood City, CA (US); Davinder Singh, Cupertino, CA (US); Samarpit Bhatia, Santa Clara, CA (US); Shannon Barnes, Gilbert, AZ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 598 days.

(21) Appl. No.: 15/637,632

(22) Filed: Jun. 29, 2017

(65) Prior Publication Data
US 2019/0005203 A1 Jan. 3, 2019

(51) Int. Cl.
| | |
|---|---|
| G06F 21/10 | (2013.01) |
| G06F 21/62 | (2013.01) |
| G06F 21/33 | (2013.01) |
| H04N 21/2387 | (2011.01) |
| G06F 16/735 | (2019.01) |
| H04N 21/254 | (2011.01) |

(52) U.S. Cl.
CPC ............ *G06F 21/10* (2013.01); *G06F 16/735* (2019.01); *G06F 21/33* (2013.01); *G06F 21/629* (2013.01); *H04N 21/2387* (2013.01); *H04N 21/2541* (2013.01)

(58) Field of Classification Search
CPC ........ G06F 16/735; G06F 21/10; G06F 21/33; G06F 21/629; H04N 21/2387

USPC ............................................. 705/71
See application file for complete search history.

(56) References Cited

U.S. PATENT DOCUMENTS

| | | | | |
|---|---|---|---|---|
| 2007/0255580 | A1* | 11/2007 | Cole ...................... | G06F 21/10 |
| | | | | 705/1.1 |
| 2008/0168568 | A1* | 7/2008 | Brodersen .......... | H04N 21/8355 |
| | | | | 348/E7.056 |
| 2013/0117451 | A1* | 5/2013 | Du ....................... | H04L 63/102 |
| | | | | 709/225 |

(Continued)

FOREIGN PATENT DOCUMENTS

CN 102647626 A * 8/2012

OTHER PUBLICATIONS

Marianne Crowe and Susan Pandy, Is Payment Tokenization Ready for Primetime, Jun. 11, 2015, 51Pages (Year: 2015).*

*Primary Examiner* — Steven S Kim
*Assistant Examiner* — Zesheng Xiao

(57) ABSTRACT

A method of media content discovery and playback, the method including receiving a query for media content items from a search client, the query including one or more user subscriber group identifiers and a plurality of search criteria, filtering a plurality of available media content items according to the query to generate a list of matching content items among the plurality of available media content items, returning the list of matching content items to the search client, receiving from the search client a selection token with a content item to subscriber group mapping, providing the token to a user rights manager, receiving a signature authentication from the user rights manager, and issuing a playback key to the search client.

17 Claims, 6 Drawing Sheets

(56) References Cited

U.S. PATENT DOCUMENTS

2016/0117746 A1\* 4/2016 Palasamudram ...... G06Q 10/20
  705/26.5
2018/0211342 A1\* 7/2018 Hoareau ................. H04L 65/60

\* cited by examiner

SYSTEMS AND METHODS FOR VIDEO CONTENT RESTRICTION CATEGORIZATION AND EVALUATION

TECHNICAL FIELD

Various embodiments of the present disclosure relate generally to online media content discovery and playback and, more particularly, to systems and methods for checking and enforcing distributed rights management at playback time.

BACKGROUND

Rights management systems provide a mechanism for specifying a variety of video content management rights. Such rights may include license-based restrictions, such as rights attached to the content based on a license. For example, the content may be licensed for viewing on certain device types or in certain geographical areas, etc. Such rights may also include business-based requirements, such as restrictions that are based on business policies added to derive additional revenue. Most typically, these are in the form of a subscription-based model such as subscription tiers.

The content restrictions can be applied at content discovery (when the user is interacting with the application experience) as well as content delivery (when the content will be played back). Filtering during discovery may provide a better user experience as inaccessible content can be filtered out which can reduce the amount of time spent in content discovery and increase the time spent viewing content. Enforcing rights during playback may ensure that malicious users attempting to playback without proper discovery will have rights uniformly enforced.

A typical video delivery service stores content metadata (title, description, image references, etc.) in a content management system (CMS) with search and filtering capabilities, while users' entitlements are stored in a user management system. Such a system may result in increased latency and reduced availability to perform discovery filtering because the rights are not stored with the content. A common approach to address this problem is to denormalize the content restrictions in the CMS system to optimize for content discovery and forgo the playback check. However, this approach may increase the potential attack vectors, specifically in web-based playback by allowing access to the underlying content and making key requests directly, thus bypassing the normal discovery checking.

The present disclosure is directed to overcoming one or more of these above-referenced challenges.

SUMMARY OF THE DISCLOSURE

According to certain aspects of the disclosure, systems and methods are disclosed for media content discovery and playback.

In one embodiment, a computer-implemented method is disclosed for media content discovery and playback. The method includes receiving a query for media content items from a search client, the query including one or more user subscriber group identifiers and a plurality of search criteria, filtering a plurality of available media content items according to the query to generate a list of matching content items among the plurality of available media content items, returning the list of matching content items to the search client, receiving from the search client a selection token with a content-item-to-subscriber-group mapping, providing the token to a user rights manager, receiving a signature authentication from the user rights manager, and issuing a playback key to the search client.

According to certain aspects of the disclosure, non-transitory computer readable media are disclosed storing a program causing a computer to execute a method of media content discovery and playback. One method comprises: receiving a query for media content items from a search client, the query including one or more user subscriber group identifiers and a plurality of search criteria, filtering a plurality of available media content items according to the query to generate a list of matching content items among the plurality of available media content items, returning the list of matching content items to the search client, receiving from the search client a selection token with a content-item-to-subscriber-group mapping, providing the token to a user rights manager, receiving a signature authentication from the user rights manager, and issuing a playback key to the search client.

In accordance with another embodiment, a system is disclosed for media content discovery and playback. The system comprises: a memory having processor-readable instructions stored therein; and a processor configured to access the memory and execute the processor-readable instructions, which when executed by the processor configures the processor to perform a plurality of functions, including functions to: receive a query for media content items from a search client, the query including one or more user subscriber group identifiers and a plurality of search criteria, filter a plurality of available media content items according to the query to generate a list of matching content items among the plurality of available media content items, return the list of matching content items to the search client, receive from the search client a selection token with a content-item-to-subscriber-group mapping, provide the token to a user rights manager, receive a signature authentication from the user rights manager, and issue a playback key to the search client.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that enforcing distributed rights management checking at playback time may reduce non-runtime interaction between a subscriber group system and a content management system. The disclosed systems and methods discussed below may allow the systems to scale independently and achieve higher availability.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to media content discovery and playback.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
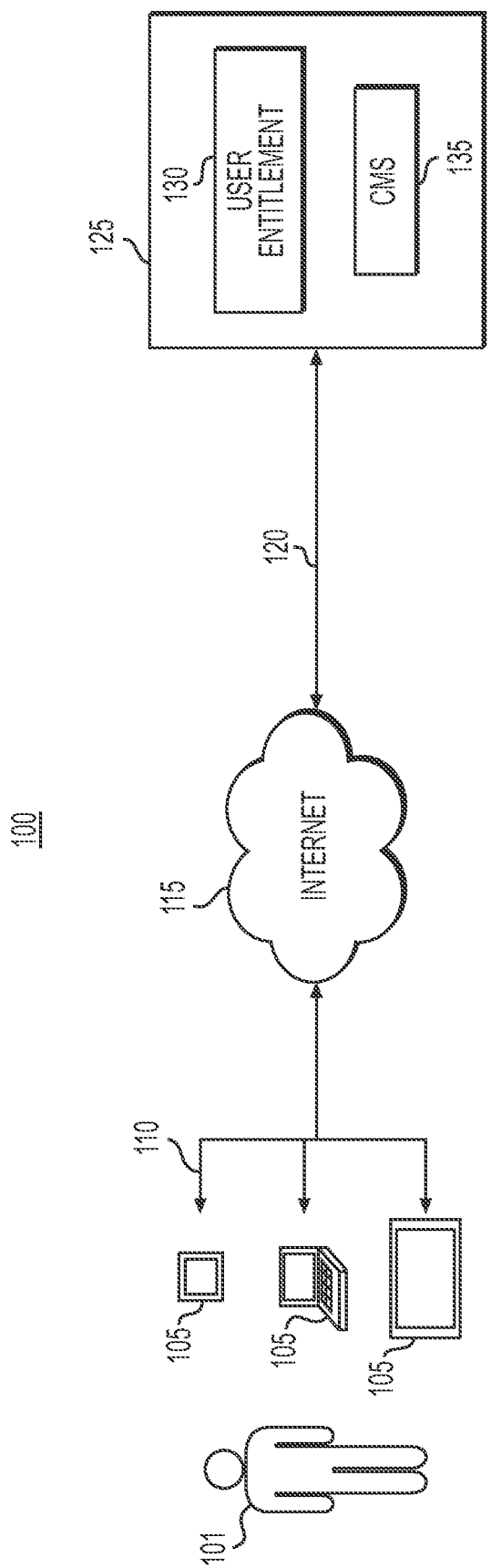
FIG. 1 depicts an exemplary system infrastructure for media content discovery and playback, according to one or more embodiments.
Figure 2:
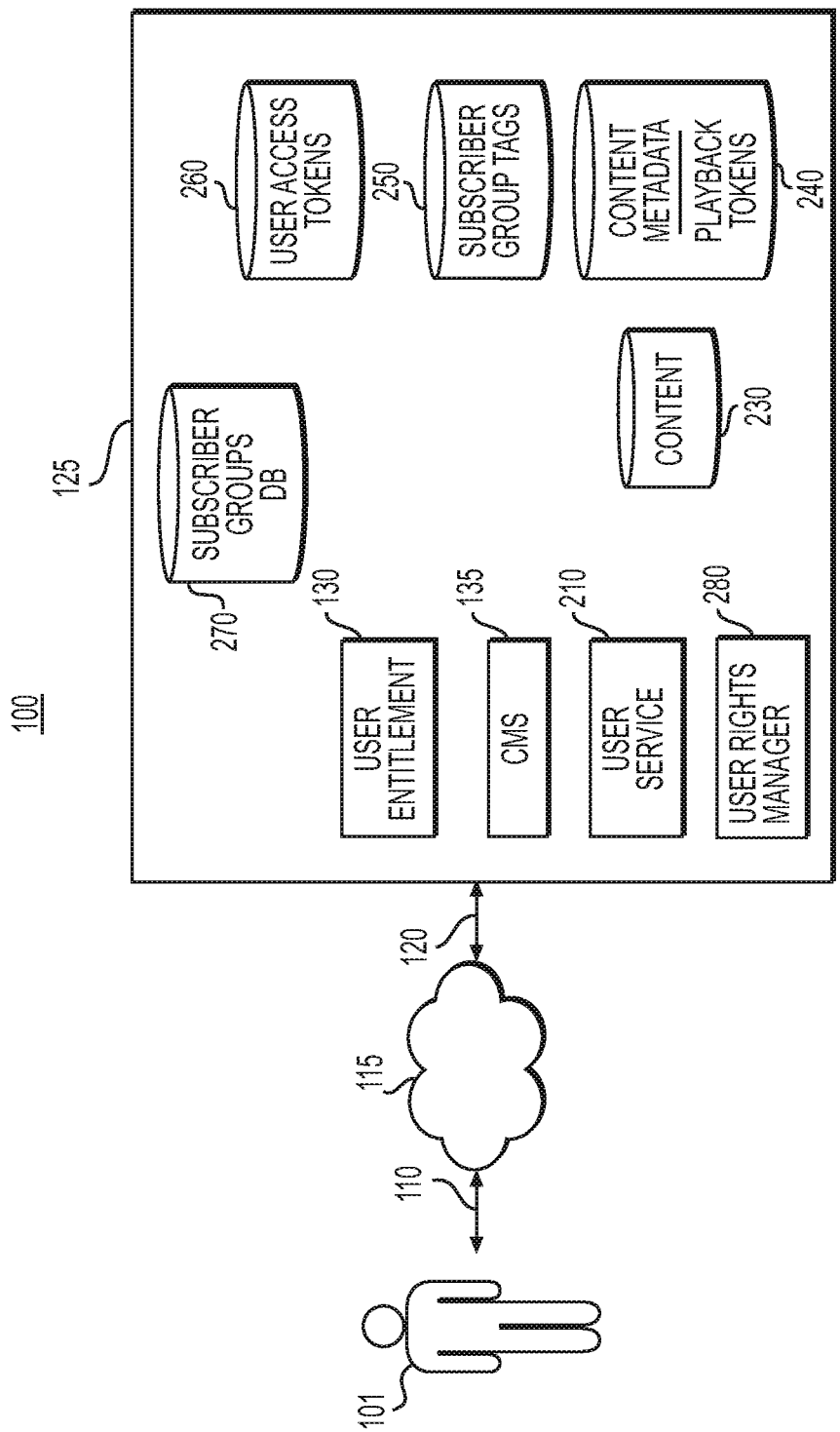
FIG. 2 depicts an exemplary system infrastructure for media content discovery and playback, according to one or more embodiments.

Any suitable system infrastructure may be put into place to allow media content discovery and playback. FIGS. 1 and 2 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As shown in FIG. 1, in an environment for media content discovery and playback, a user 101 may access online media content using one or more electronic devices 105. Such electronic devices 105 may include, for example, a mobile device, such as a smartphone or tablet, a personal computer, or a smart television, etc. Electronic devices 105 may connect to a content provider 125 by way of a local area network (LAN) 110 connecting to a wide area network (WAN) 115 such as the Internet or a cloud computing environment, etc. LAN 110 may be a wired or wireless network including, for example, an Ethernet wired network, an IEEE 802.11 wireless network, or a cellular data connection, etc. Content provider 125 may likewise connect to WAN 115 by way of a LAN 120. Content provider 125 may include a user entitlement system 130 and a content management system (CMS) 135. Content provider 125 will be described in greater detail below.

As shown in FIG. 2, content provider 125 may include user entitlement system 130, which may maintain information about the users and their entitlements as well as user subscriber groups, and CMS 135, which may maintain metadata associated with online media content items along with both license based restrictions and business restrictions. Content provider 125 may further include a user service 210, which may provide user interfaces and application programming interfaces (APIs) through which user 101 may, for example, log in to the content provider, perform account management functions, search for available online media content items, request playback of selected online media content items, etc. User interaction with content provider 125 may be, for example, by way of an application running on a personal computer 105, an app running on a mobile device 105 or smart TV 105, or a web site provided by content provider 125 and accessible by way of any of devices 105.

Content provider 125 may maintain information relating to users, online media content, subscriber groups, online media content access, and online media content playback in one or more databases, as shown in FIG. 2. Such information may be maintained in any type of data store or recording medium that may be used to store any type of data. Such information may be stored in, for example, online media content storage 230, online media content and playback tokens 240, subscriber group tags 250, user access tokens 260, and subscriber groups database 270. Although each of these databases are depicted separately in FIG. 2, but it is to be understood that they may be stored together in a single data store or recording medium.

The services provided by content provider 125 may be employed to support the storage, also known as "on-boarding," of online media content, the specification of subscriber groups associated with users of content provider 125, discovery of online media content by a user, and playback of online media content by the user.

These functions may support a number of usage scenarios. For example, all users may see all content either via initial purchase or where all content is free. In this scenario, there may be a single subscriber group. However, content may have additional restrictions (geography, time, user demographics, etc.). In another scenario, there may be two-tiered content with some content being free and others paid. In this scenario, there may be two subscriber groups. In another scenario, there may be multi-tiered content (for example, gold, silver, and bronze). In this scenario, there may be a separate subscriber group for each tier, and content may be partitioned based on which subscribers should see it. In another scenario, there may be a time-limited preview. In this scenario, there may be a subscriber group accessible to all users that is time limited. This scenario is similar to two tiered content, but with time limitations on one or both tiers. In another scenario, there may be multi-tiered time limited content. For example, there may be gold, silver, bronze tiers, but with timed access to content. The gold tier may have immediate access, the silver tier may have access after 7 days, and the bronze tier may have access after an extended time. In this scenario, there may be multiple subscriber groups for incoming content, with package availability based on the timed availability. In another scenario, there may be multiple default subscriber groups based on runtime attributes, such as network carrier, user geography, etc. In this scenario, there may be multiple default subscriber groups, each with different runtime criteria. In other scenarios, additional subscriber groups may be created based on content purchases for a category of content, such as a league pass for content related to a sports league, or for time-limited access to rented content.

Figure 3:
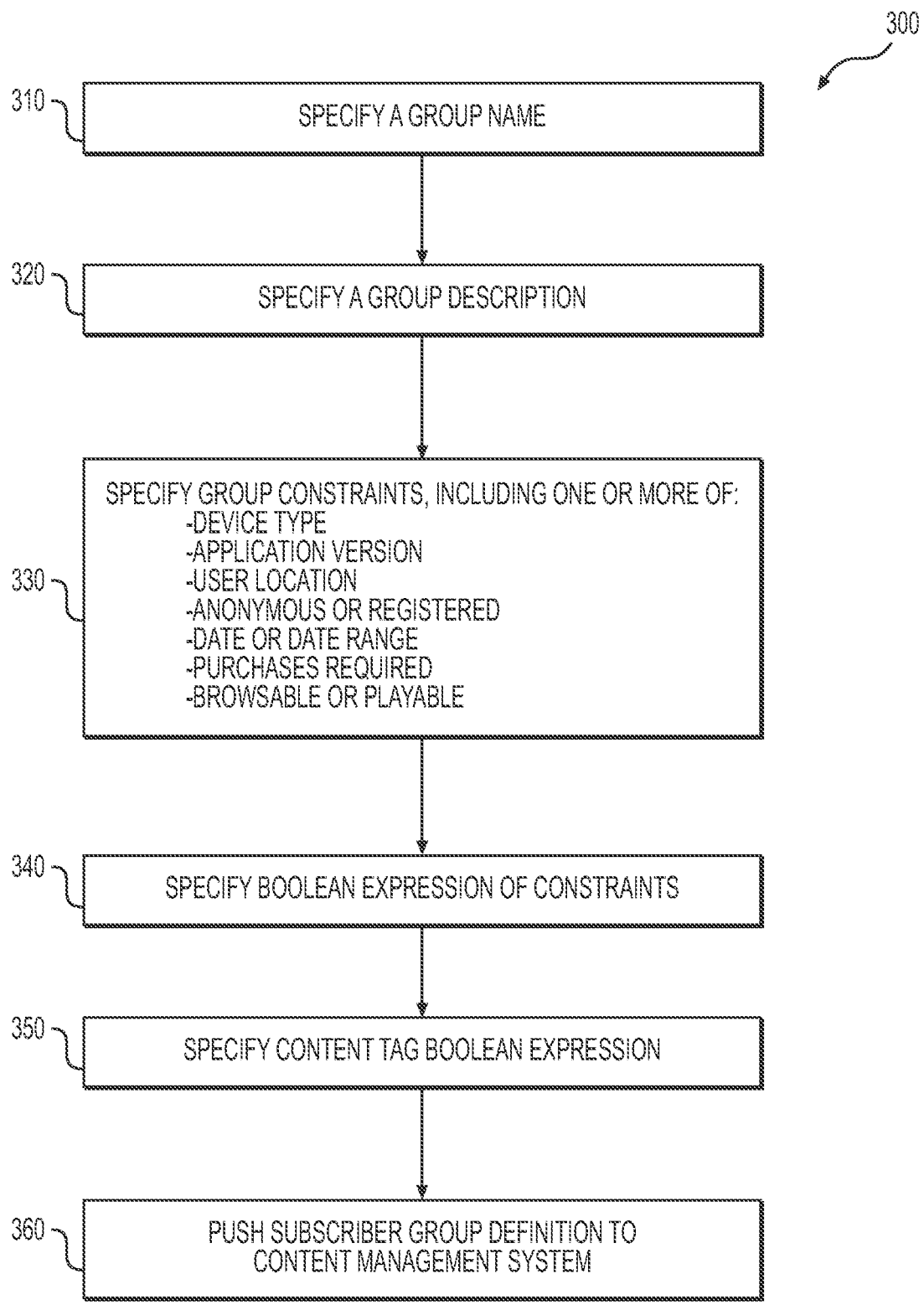
FIG. 3 depicts a flowchart of a method of creating subscriber groups, according to one or more embodiments.

FIG. 3 depicts a flowchart of a method of creating a subscriber group, according to one or more embodiments. As shown in FIG. 3, at operation 310, user entitlement service 130 may specify a group name. Selection of a subscriber group name may be based on a selected model for the content associated with the subscriber group. For example, a multi-tier model may create multiple subscriber groups with associated names.

At operation 320, user entitlement service 130 may specify a group description. At operation 330, user entitlement service 130 may specify group constraints specifying filters evaluated at runtime during the discovery or retrieval of online media content items, including, for example, one or more of: a device type, an application version, a user location, whether the online media content item accessible by an anonymous user or a registered user, a date or date range during which the online media content item is accessible, whether a purchase, or other action to add the online media content item to a user account, is required in order to access the online media content item, whether the online media content item is browsable or playable, etc. For example, if a content item should be available to a limited time, the subscriber group may be created with an availability window having a specified start and end time. If a start and end time is not set, then the content item may be available for consumption at any time. At the end of the availability window, the subscriber group may be removed so the content item is no longer available to users. The constraints specified for a subscriber group may be evaluated at during content item discovery and playback, discussed in greater detail below, to determine what content items are available to a user. At operation 340, user entitlement service 130 may specify a Boolean expression of constraints to be satisfied. For example, constraints may be combined by common Boolean operators (AND, OR, NOT, etc.), such as "location=20008 OR registered=YES."

Each subscriber group may contain a set of tags that may be used to evaluate content added to the CMS. A default tag may automatically be set during the creation of the subscriber group. In addition, when content is added to the CMS, all of the tags available may be displayed for selection. One or more tags may be selected to tag a content item. At operation 350, user entitlement service 130 may specify a content tag Boolean expression. The content tag Boolean expression in which any content which matches the Boolean tag criteria (AND, OR, NOT against a set of tags) can be considered applicable to the subscriber group. This may be used by the content management system (CMS) to determine which subscriber groups are applicable to a set of content. The specified information for creation of the subscriber group may be provided, for example, by a user, by a system administrator, by a configuration specification provided for the subscriber group, by an automated process for batch processing of subscriber groups, etc. At operation 360, user entitlement service 130 may push the subscriber group definition to the content management system, for example, when changes are made to a tag expression for a subscriber group. The subscriber group definition may also be stored by the content provider 125, for example in subscriber groups database 270 depicted in FIG. 2.

Figure 4:
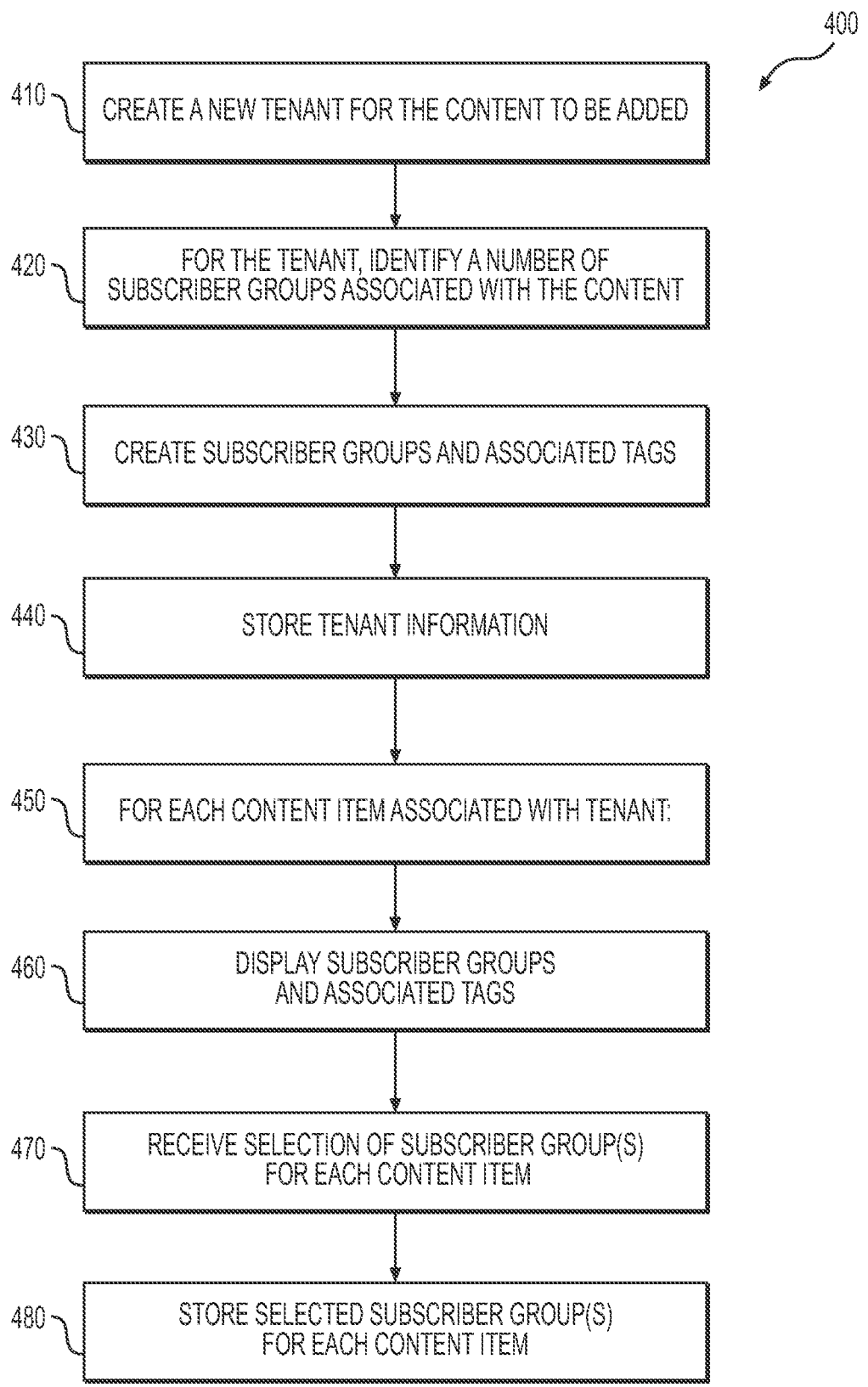
FIG. 4 depicts a flowchart of a method of adding media content items to a content management system, according to one or more embodiments.

FIG. 4 depicts a flowchart of a method of adding media content items to a content management system, according to one or more embodiments. At operation 410, CMS 135 may create a new tenant for the content to be added. At operation 420, CMS 135 may, for the tenant, identify a number of subscriber groups associated with the content. At operation 430, CMS 135 may create subscriber groups and associated tags. At operation 440, CMS 135 may store tenant information. At operations 450-480, CMS 135 may, for each content item associated with a tenant: at operation 460, CMS 135 may display subscriber groups and associated tags. For example, each subscriber group may be displayed with a human-readable name to facilitate selection of appropriate subscriber groups for the content item. The subscriber group tags may be arbitrary and may map to one or more subscriber groups. The subscriber group tags may, for example, highlight a feature of a content item, such as, for example, a premier, a content provider, or a genre, etc., and may allow a provider to group content in multiple ways. At operation 470, CMS 135 may receive selection of subscriber group(s) for each content item. The content item may have associated items of metadata describing the content item. In preparing the content item and associated metadata for online delivery, CMS 135 may evaluate the tag expression for each selected subscriber group and matching subscriber group identifiers may be added to the content metadata.

At operation 480, CMS 135 may store selected subscriber group(s) for each content item. The subscriber group tags may be stored by CMS 135, for example, in subscriber group tags database 250 depicted in FIG. 2. If a change in a subscriber group tag expression is received, CMS 135 may evaluate the existing content to add or remove subscriber tags from content items as needed. CMS 135 may also maintain storage of store content items, for example in content data store 230, and content metadata, in content metadata database 240.

Figure 5:
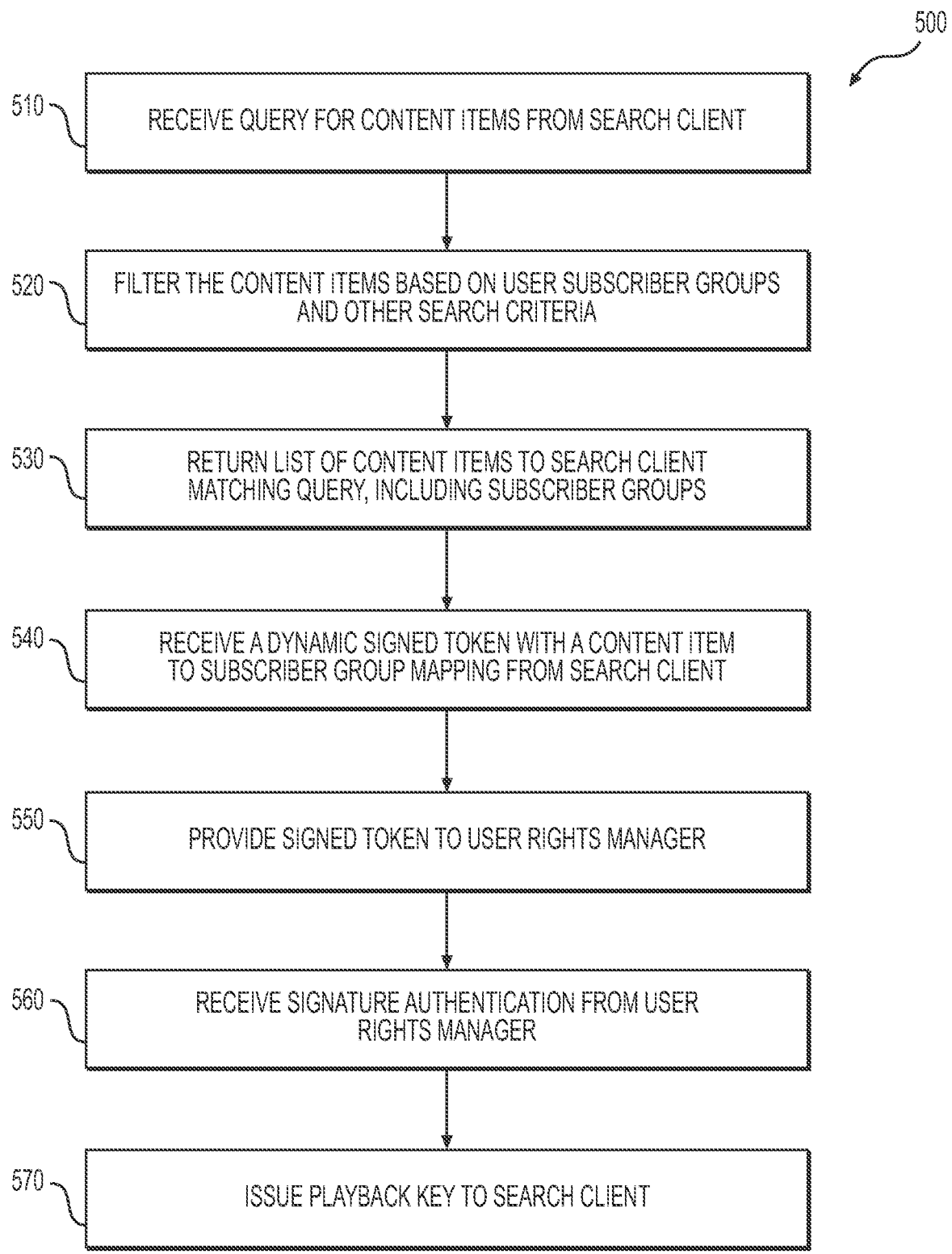
FIG. 5 depicts a flowchart of a method of displaying media content to a user, according to one or more embodiments.

FIG. 5 depicts a flowchart of a method of displaying media content to a user, according to one or more embodiments. Content discovery and playback may be initiated by a user logging on to the content provider 125, such as through user service 210, depicted in FIG. 2. As part of the user log in, information about a user's subscriber groups and may be evaluated and encoded as a user access token. Content provider 125 may store the user access token for later use, for example in user access token database 260 depicted in FIG. 2.

As shown in FIG. 5, at operation 510, CMS 135 may receive a query for content items from a search client, such as an application running on a device 105 controlled by user 101. At operation 520, CMS 135 may filter the content items based on user subscriber groups and other search criteria. For example, subscriber groups currently applicable to the user are matched along with the other filtering done for the query (title match, etc.). At operation 530, CMS 135 may return list of content items to search client matching query, including subscriber groups. In addition to returning content to the application, CMS 135 may generate a playback token that may be used when requesting playback decryption keys. The playback token may contain a timestamp, an identifier of the content, associated subscriber groups, and indicators of other playback conditions, such as, for example, whether ads are required, geographic restrictions, etc. The playback token may be signed using an appropriate cryptographic signing algorithm, such as, for example, SHA256. The playback token may be returned from the search client when requesting playback decryption keys. The playback token may not have any user-embedded data, possibly allowing it to be cached and used across multiple users. Playback tokens may be stored by the content provider 125, for example, associated with content metadata stored in content metadata database 240.

At operation 540, CMS 135 may receive a dynamic signed selection token with a content-item-to-subscriber-group mapping from search client. The token may be digitally signed using a cryptographic key. At operation 550, CMS 135 may provide signed token to user rights manager 280. The rights check during playback may require that the current user's subscriber groups intersect with the content subscriber groups and that no constraints are violated. For example, if the current user has subscriber groups 1, 2, 3 and the content requires subscriber groups 1, 2, then playback key may be issued. At operation 560, CMS 135 may receive signature authentication from the user rights manager 280. At operation 570, CMS 135 may issue playback key to search client.

Figure 6:
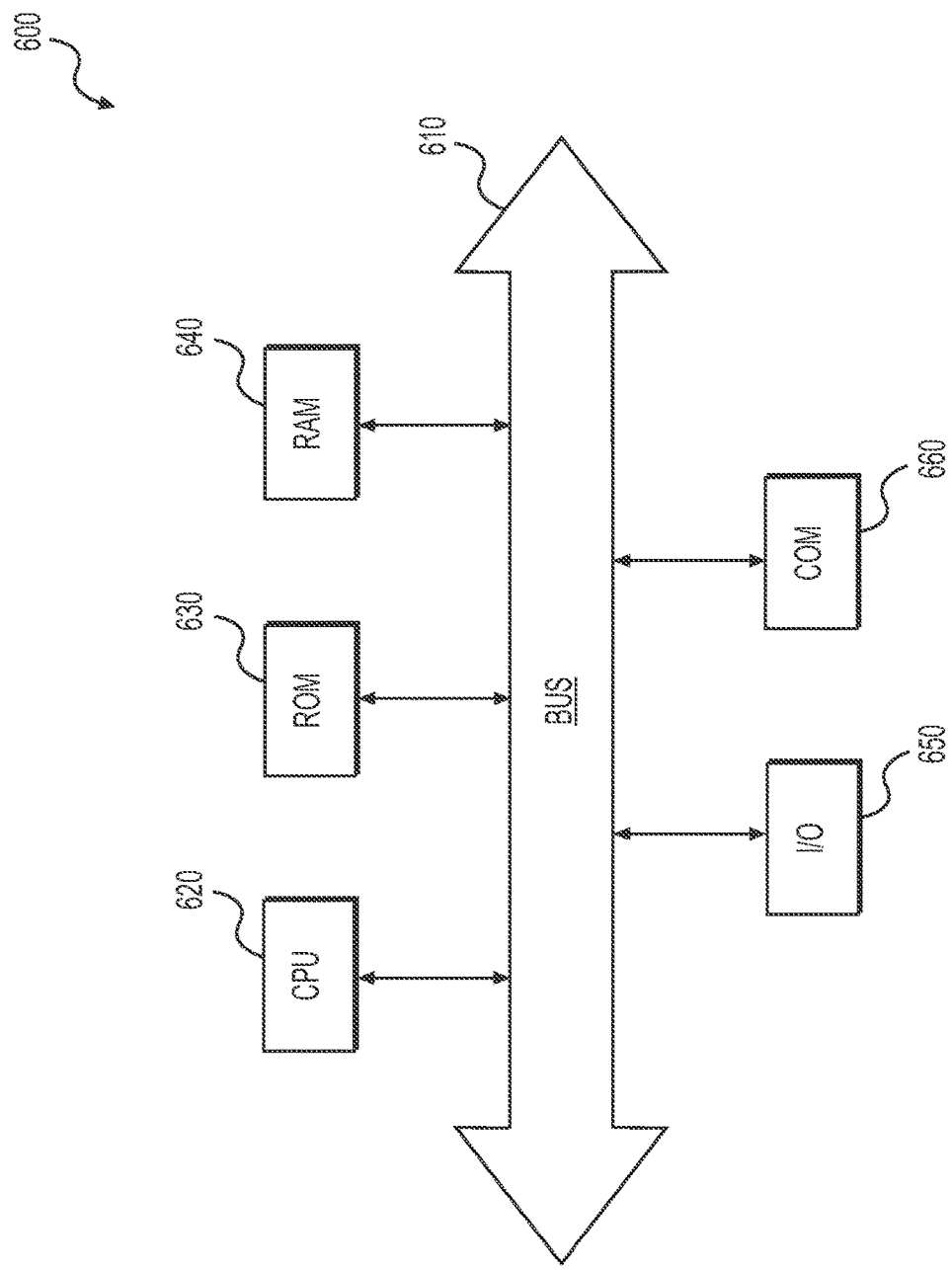
FIG. 6 depicts an exemplary device in which one or more embodiments may be implemented

FIG. 6 illustrates a high-level functional block diagram of an exemplary device 600, in which embodiments of the present disclosure, or portions thereof, may be implemented, e.g., as computer-readable code. For example, each of the exemplary systems, user interfaces and methods described above with respect to FIGS. 1-5 can be implemented in device 600 using hardware, software, firmware, tangible computer readable media having instructions stored thereon, or a combination thereof and may be implemented in one or more computer systems or other processing systems. Hardware, software, or any combination of such may implement each of the exemplary systems, user interfaces and methods described above with respect to FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-5 may be implemented using device 600. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 6, device 600 may include a central processing unit (CPU) 620. CPU 620 may be any type of processor device including, for example, any type of special purpose or a general purpose microprocessor device. As will be appreciated by persons skilled in the relevant art, CPU 620 also may be a single processor in a multi-core/multi-processor system, such system operating alone, or in a cluster of computing devices operating in a cluster or server farm. CPU 620 may be connected to a data communication infrastructure 610, for example, a bus, message queue, network, or multi-core message-passing scheme.

Device 600 may also include a main memory 640, for example, random access memory (RAM), and may also include a secondary memory 630. Secondary memory 630, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 630 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 600.

Device 600 may also include a communications interface ("COM") 660. Communications interface 660 allows software and data to be transferred between device 600 and external devices. Communications interface 660 may include a modem, a network interface (such as an Ethernet card), a communications port, a PCMCIA slot and card, or the like. Software and data transferred via communications interface 660 may be in the form of signals, which may be electronic, electromagnetic, optical, or other signals capable of being received by communications interface 660. These signals may be provided to communications interface 660 via a communications path of device 600, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of optimizing discovery and playback of online media content, the method comprising:
    receiving, by a server processor, a query for one or more online media content items from a search client device, the query including (i) one or more user subscriber group identifiers, (ii) one or more search criteria elements, (iii) one or more group constraints identifying one or more of a device type, an application version, or a user location, and (iv) one or more content specific group constraints identifying one or more of whether an online media content item is accessible by an anonymous user or a registered user, a date or date range during which an online media content item is accessible, whether a purchase or other action to add an online media content item to a user account is required in order to access the online media content item, or whether an online media content item is browsable or playable;
    encoding, by the server processor, the one or more user subscriber group identifiers as a user access token;
    filtering, by the server processor, the one or more online media content items by evaluating the one or more group constraints, the one or more content specific group constraints, and the one or more search criteria elements, received as part of the query for the one or more online media content items from the search client device, to generate a list of one or more matching online media content items;
    sending, by the server processor, the list of one or more matching online media content items to the search client device;
    generating, by the server processor, a cacheable playback token for each of the one or more matching online media content items, based on the encoded user access token and based on the generated list of one or more matching online media content items, each playback token to be used when requesting playback decryption keys, and each playback token not including user-embedded data and including a timestamp, an identifier of the online media content, associated subscriber groups, group constraints for the associated subscriber groups, and indicators of other playback conditions including whether ads are required and geographic restrictions;
    receiving, by the server processor, a selection token from the search client with a content-item-to-subscriber-group mapping, the content-item-to-subscriber-group mapping providing a mapping of required subscriber groups for one or more selected online media content items, of the generated list of one or more matching online media content items;
    based on receiving the selection token from the search client device, providing, by the server processor, the selection token to a user rights manager;
    receiving, by the server processor, a signature authentication from the user rights manager based on confirmation that (a) the one or more user subscriber group identifiers intersect with the associated subscriber groups of the playback token, and (b) none of the group constraints of the associated subscriber groups of the playback token are violated; and
    based on the signature authentication and the confirmation that (a) there is intersection between the one or more subscriber group identifiers and the associated subscriber groups of the playback token and (b) none of the group constraints of the associated subscriber groups of the playback token are being violated, sending, by the server processor, a playback key and the generated playback token for the one or more selected online media content items to the search client device.

2. The method of claim 1, wherein a subscriber group definition for each subscriber group associated with the one or more user subscriber group identifiers includes one or more content tags.

3. The method of claim 2, wherein the subscriber group definition for each subscriber group associated with the one or more user subscriber group identifiers further includes a Boolean expression combining two or more content tags of the one or more content tags of the subscriber group definition.

4. The method of claim 3, wherein the filtering of the one or more online media content items further comprises determining that an online media content item, of the one or more online media content items, matches at least one content tag of the one or more content tags of the subscriber group definition.

5. The method of claim 1, the method further comprising: storing the user access token in a database.

6. The method of claim 3, wherein the selection token is digitally signed using a cryptographic key.

7. A non-transitory computer readable medium storing a program causing a computer to execute a method of optimizing discovery and playback of the online media content, the method comprising:
    receiving, by a server processor, a query for one or more online media content items from a search client device, the query including (i) one or more user subscriber group identifiers, (ii) one or more search criteria elements, (iii) one or more group constraints identifying one or more of a device type, an application version, or a user location, and (iv) one or more content specific group constraints identifying one or more of whether an online media content item is accessible by an anonymous user or a registered user, a date or date range during which an online media content item is accessible, whether a purchase or other action to add an online media content item to a user account is required in order to access the online media content item, or whether an online media content item is browsable or playable;

encoding, by the server processor, the one or more user subscriber group identifiers as a user access token;

filtering, by the server processor, the one or more online media content items by evaluating the one or more group constraints, the one or more content specific group constraints, and the one or more search criteria elements, received as part of the query for the one or more online media content items from the search client device, to generate a list of one or more matching online media content items;

sending, by the server processor, the list of one or more matching online media content items to the search client device;

generating, by the server processor, a cacheable playback token for each of the one or more matching online media content items, based on the encoded user access token and based on the generated list of one or more matching online media content items, each playback token to be used when requesting playback decryption keys, and each playback token not including user-embedded data and including a timestamp, an identifier of the online media content, associated subscriber groups, group constraints for the associated subscriber groups, and indicators of other playback conditions including whether ads are required and geographic restrictions;

receiving, by the server processor, a selection token from the search client with a content-item-to-subscriber-group mapping, the content-item-to-subscriber-group mapping providing a mapping of required subscriber groups for one or more selected online media content items, of the generated list of one or more matching online media content items;

based on receiving the selection token from the search client device, providing, by the server processor, the selection token to a user rights manager;

receiving, by the server processor, a signature authentication from the user rights manager based on confirmation that (a) the one or more user subscriber group identifiers intersect with the associated subscriber groups of the playback token, and (b) none of the group constraints of the associated subscriber groups of the playback token are violated; and based on the signature authentication and the confirmation that (a) there is intersection between the one or more subscriber group identifiers and the associated subscriber groups of the playback token and (b) none of the group constraints of the associated subscriber groups of the playback token are being violated, sending, by the server processor, a playback key and the generated playback token for the one or more selected online media content items to the search client device.

8. The non-transitory computer readable medium according to claim 7, wherein a subscriber group definition for each subscriber group associated with the one or more user subscriber group identifiers includes one or more content tags.

9. The non-transitory computer readable medium according to claim 8, wherein the subscriber group definition for each subscriber group associated with the one or more user subscriber group identifiers further includes a Boolean expression combining two or more content tags among the one or more content tags of the subscriber group definition.

10. The non-transitory computer readable medium according to claim 9, wherein the filtering of the one or more online media content items further comprises determining that an online media content item, of the one or more media content items, matches at least one content tag of the one or more content tags of the subscriber group definition.

11. The non-transitory computer readable medium according to claim 7, the method further comprising:
storing the user access token in a database.

12. The non-transitory computer readable medium according to claim 7, wherein the selection token is digitally signed using a cryptographic key.

13. A computer system for optimizing discovery and playback of online media content, the system comprising:
a memory having processor-readable instructions stored therein; and
a processor configured to access the memory and execute the processor-readable instructions, which when executed by the processor configures the processor to perform a plurality of functions, including functions to:
receive, by a server processor, a query for one or more online media content items from a search client device, the query including (i) one or more user subscriber group identifiers, (ii) one or more search criteria elements, (iii) one or more group constraints identifying one or more of a device type, an application version, or a user location, and (iv) one or more content specific group constraints identifying one or more of whether an online media content item is accessible by an anonymous user or a registered user, a date or date range during which an online media content item is accessible, whether a purchase or other action to add an online media content item to a user account is required in order to access the online media content item, or whether an online media content item is browsable or playable;
encode, by the server processor, the one or more user subscriber group identifiers as a user access token;
filtering, by the server processor, the one or more online media content items by evaluating the one or more group constraints, the one or more content specific group constraints, and the one or more search criteria elements, received as part of the query for the one or more online media content items from the search client device, to generate a list of one or more matching online media content items;
send, by the server processor, the list of one or more matching online media content items to the search client device;
generate, by the server processor, a cacheable playback token for each of the one or more matching online media content items, based on the encoded user access token and based on the generated list of one or more matching online media content items, each playback token to be used when requesting playback decryption keys, and each playback token not including user-embedded data and including a timestamp, an identifier of the online media content, associated subscriber groups, group constraints for the associated subscriber groups, and indicators of other playback conditions including whether ads are required and geographic restrictions;
receive, by the server processor, a selection token from the search client with a content-item-to-subscriber-group mapping, the content-item-to-subscriber-group mapping providing a mapping of required subscriber groups for one or more selected online content media items, of the generated list of one or more matching online media content items;

based on receiving the selection token from the search client device, provide, by the server processor, the selection token to a user rights manager;

receive, by the server processor, a signature authentication from the user rights manager based on confirmation that (a) the one or more user subscriber group identifiers intersect with the associated subscriber groups of the playback token, and (b) none of the group constraints of the associated subscriber groups of the playback token are violated; and based on the signature authentication and the confirmation that (a) there is intersection between the one or more subscriber group identifiers and the associated subscriber groups of the playback token and (b) none of the group constraints of the associated subscriber groups of the playback token are being violated, send, by the server processor, a playback key and the generated playback token for the one or more selected online media content items to the search client device.

14. The computer system of claim 13, wherein a subscriber group definition for each subscriber group associated with the one or more user subscriber group identifiers includes one or more content tags.

15. The computer system of claim 14, wherein the subscriber group definition for each subscriber group associated with the one or more user subscriber group identifiers further includes a Boolean expression combining two or more content tags of the one or more content tags of the subscriber group definition.

16. The computer system of claim 15, wherein the filtering of the one or more online media content items further comprises determining that an online media content item, of the one or more media content items, matches at least one content tag of the one or more content tags of the subscriber group definition.

17. The computer system of claim 13, wherein the plurality of functions performed by the processor when executing the processor-readable instructions further includes functions to: store the user access token in a database.

* * * * *